United States Patent [19]
Itoi et al.

[11] Patent Number: 5,771,919
[45] Date of Patent: Jun. 30, 1998

[54] FLUID CONTROLLER

[75] Inventors: Shigeru Itoi; Michio Yamaji; Tetsuya Kojima, all of Osaka, Japan

[73] Assignee: Fujikin Incorporated, Osaka, Japan

[21] Appl. No.: 682,366

[22] Filed: Jul. 17, 1996

[30]     Foreign Application Priority Data

Jul. 19, 1995   [JP]   Japan .................................. 7-182350

[51] Int. Cl.$^6$ ................................................ F16K 25/00
[52] U.S. Cl. .................................... 137/454.6; 285/137.1
[58] Field of Search ............................... 137/486, 487.5, 137/454.6; 285/137.1

[56]             References Cited

U.S. PATENT DOCUMENTS

| | | | |
|---|---|---|---|
| 1,851,940 | 3/1932 | Williams | 285/137.1 |
| 4,382,619 | 5/1983 | Grisebach | 285/137.1 |
| 4,516,784 | 5/1985 | Merz | 277/180 |
| 4,650,227 | 3/1987 | Babuder et al. | 285/379 |
| 4,687,020 | 8/1987 | Doyle | 137/486 |
| 4,695,034 | 9/1987 | Shimizu et al. | 137/486 |
| 4,796,896 | 1/1989 | Anderson, Jr. | |
| 5,236,227 | 8/1993 | Adams et al. | 285/137.1 |
| 5,354,101 | 10/1994 | Anderson, Jr. | 285/137.1 |
| 5,611,215 | 3/1997 | Saito et al. | 285/137.1 |

FOREIGN PATENT DOCUMENTS

| | | |
|---|---|---|
| 0 134 185 A2 | 3/1985 | European Pat. Off. . |
| 0 597 819 A2 | 5/1994 | European Pat. Off. . |
| 1 650 420 A | 11/1971 | Germany . |
| 2 223 115 A | 11/1972 | Germany . |

OTHER PUBLICATIONS

Patent Abstracts of Japan, vol. 017, No. 592 (M–1502), 28 Oct. 1993 & JP 05 172265A (Motoyama Seisakusho), 9 Jul. 1993.

*Primary Examiner*—Denise L. Ferensic
*Assistant Examiner*—Joanne Y. Kim
*Attorney, Agent, or Firm*—Armstrong, Westerman, Hattori, McLeland & Naughton

[57]             ABSTRACT

A fluid controller 2 comprises a controller main body 6 formed with an inlet channel 42 and an outlet channel 43 each having a downwardly open end, an operating portion 7 provided on the main body 6 and integral therewith for opening and closing the outlet channel 43, and a connector 11 provided beneath the main body 6. The connector 11 has an inlet channel 41 for causing an inlet channel 40 of an inlet pipe joint member 1 to communicate with the inlet channel 42 of the main body 6, and a leftwardly open outlet channel 44 communicating with the outlet channel 43 of the main body 6. The controller main body 6 is fastened to the connector 11 with screws 17. The operating portion 7 can be removed from the connector 11 together with the main body 6.

14 Claims, 2 Drawing Sheets

5,771,919

FLUID CONTROLLER

BACKGROUND OF THE INVENTION

The present invention relates to fluid controllers such as valves, mass flow controllers or pressure regulators.

Fluid controllers are already known which comprise a controller main body having laterally open inlet channel and outlet channel, and an operating portion integral with the main body for opening and closing the channel, changing the direction of flow, or regulating the rate of flow or pressure. In fabricating a fluid control apparatus comprising various types of such fluid controllers in combination, the main bodies of the controllers are connected to one another (see JP-A-172265/1993).

If the operating portion of the conventional fluid controller malfunctions, there arises a need for replacement, whereas with the fluid control apparatus comprising fluid controllers the main bodies of which are connected to one another, the entire apparatus must be disassembled for the removal of one of the controllers. The replacement therefore requires a time-consuming cumbersome procedure, which renders the apparatus inconvenient to maintain.

SUMMARY OF THE INVENTION

An object of the present invention is to provide a fluid controller having an operating portion which can be replaced readily if malfunctioning.

The terms "upward" and "downward" are used herein for the present device as it is viewed in the state shown in FIG. 1. These terms are used for convenience of description; the device may be installed as turned upside down or as laid on its side.

The present invention provides a fluid controller which comprises a controller main body formed with an inlet channel and an outlet channel each having a downwardly open end and provided with an operating portion integral with the main body, and a connector formed with an inlet channel and an outlet channel each having an upwardly open end and communicating respectively with the inlet channel and the outlet channel of the controller main body, the connector being removably attached to the controller main body.

The operating portion, if malfunctioning, can be removed from the connector along with the controller main body according to the invention, and is therefore replaceable readily. Consequently, the controller can be maintained with an improved efficiency.

Preferably, the upwardly open inlet channel and outlet channel of the connector are each laterally open at another end of the channel. After the connector has been joined to an inlet-side member and an outlet-side member, it is then possible to remove the controller main body in a direction at right angles with the channels. This eliminates the need for the cumbersome procedure of disassembling the entire apparatus when one fluid connector is to be replaced.

A seal is provided between the controller main body and the connector. Preferably, the seal comprises a first gasket provided between an edge portion of the controller main body defining the downwardly open end of the inlet channel thereof and an edge portion of the connector defining the upwardly open end of the inlet channel thereof and opposed to the edge portion, a second gasket provided between an edge portion of the controller main body defining the downwardly open end of the outlet channel thereof and an edge portion of the connector defining the upwardly open end of the outlet channel thereof and opposed to the controller main body edge portion defining the outlet channel end, and a retainer holding the first and second gaskets thereto and attached to one of the controller main body and the connector. The two gaskets can then be accurately positioned in place by the retainer, so that even if the controller main body is repeatedly attached to and removed from the connector, the opposed portions of the controller main body and the connector provide a sealed joint.

DESCRIPTION OF THE PREFERRED EMBODIMENT

An embodiment of the invention will be described below with reference to the drawings. The terms "upward," "downward," "right" and "left" are used in the following description based on the position of the device as shown in FIG. 1.

Figure 1:
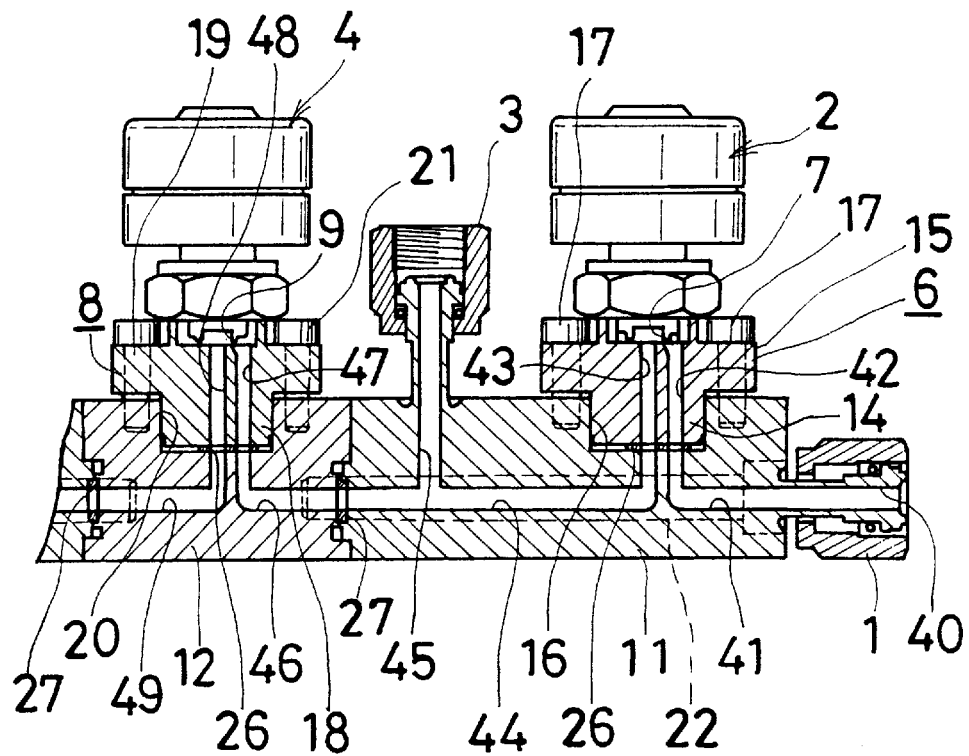
FIG. 1 is a view in vertical section showing a fluid controller embodying the invention.

FIG. 1 shows a fluid inlet-side portion of a fluid control apparatus for use in systems for producing semiconductors. A first on-off valve 2 and a second on-off valve 4 are disposed at the left side (downstream side) of an inlet pipe joint member 1.

The first on-off valve 2 comprises a valve main body 6 formed with downwardly open inlet channel 42 and outlet channel 43, an operating portion 7 positioned on the valve main body 6 and integral there-with for opening and closing the outlet channel 43, and a connector 11 disposed beneath the valve main body 6. The connector 11 is formed with an inlet channel 41 for causing an inlet channel 40 of the joint member 1 to communicate with the inlet channel 42 of the main body 6 therethrough, a leftwardly open outlet channel 44 communicating with the outlet channel 43 of the main body 6, and a branch channel 45 branching from the outlet channel 44 and provided with a pressure sensor mount 3. The valve main body 6 comprises a cylindrical portion 14 and a rectangular flange portion 15 formed at the upper end of the portion 14. The cylindrical portion 14 is fitted in an upward recess 16 formed in the connector 11, and is fastened to the connector 11 with screws 17 extending through the flange portion 15 from above at the respective four corners of the flange portion 15. Accordingly, if the operating portion 7 of the first on-off valve 2 malfunctions, the operating portion 7 is removable from the connector 11 together with the valve main body 6.

The second on-off valve 4, which has the same construction as the first on-off valve 2 except that the pressure sensor mount is absent, comprises a valve main body 8 formed with downwardly open inlet channel 47 and outlet channel 48, an operating portion 9 positioned on the main body 8 and integral therewith for opening and closing the outlet channel 48, and a connector 12 disposed beneath the main body 8. The connector 12 is formed with an inlet channel 46 for causing the outlet channel 44 of the connector 11 of the first on-off valve 2 to communicate with the inlet channel 47 of the main body 8 of the second on-off valve 4 therethrough, and a leftwardly open outlet channel 49 and communicating with the outlet channel 48 of the main body 8 of the second on-off valve 4. The valve main body 8 comprises a cylindrical portion 18 and a rectangular flange portion 19 formed at the upper end of the portion 18. The cylindrical portion 18 is fitted in an upward recess 20 formed in the connector 12, and is fastened to the connector 12 with screws 21 extending through the flange portion 19 from above. Accordingly, the operating portion 9 of the second on-off valve 4 is removable from the connector 12 along with the valve main body 8 if malfunctioning.

The connector 11 of the first on-off valve 2 is connected to the connector 12 of the second on-off valve 4 with a screw 22 extending through the connector 11 and driven into the connector 12 from the right side of the connector 11. The screw 22 is removed in disassembling the entire apparatus. A seal 27 is provided between the connector 11 and the connector 12. The seal 27 is used in holding the two channels 44, 46 in communication with each other and can be a known one. The connectors 11, 12, although separate members, can be an integral member. The seal 27 is unnecessary in this case.

A seal 26 is provided also between the cylindrical portion 14 of valve main body 6 of the first on-off valve 2 and the upward recessed portion 16 of the connector 11. The seal 26 is installed when two channels are caused to communicate with two respective channels, that is, when the inlet channels 42, 41 of the main body 6 and the connector 11 are caused to communicate with each other and when the outlet channels 43, 44 thereof are caused to communicate with each other. The seal 26 is an unknown one.

Figure 2:
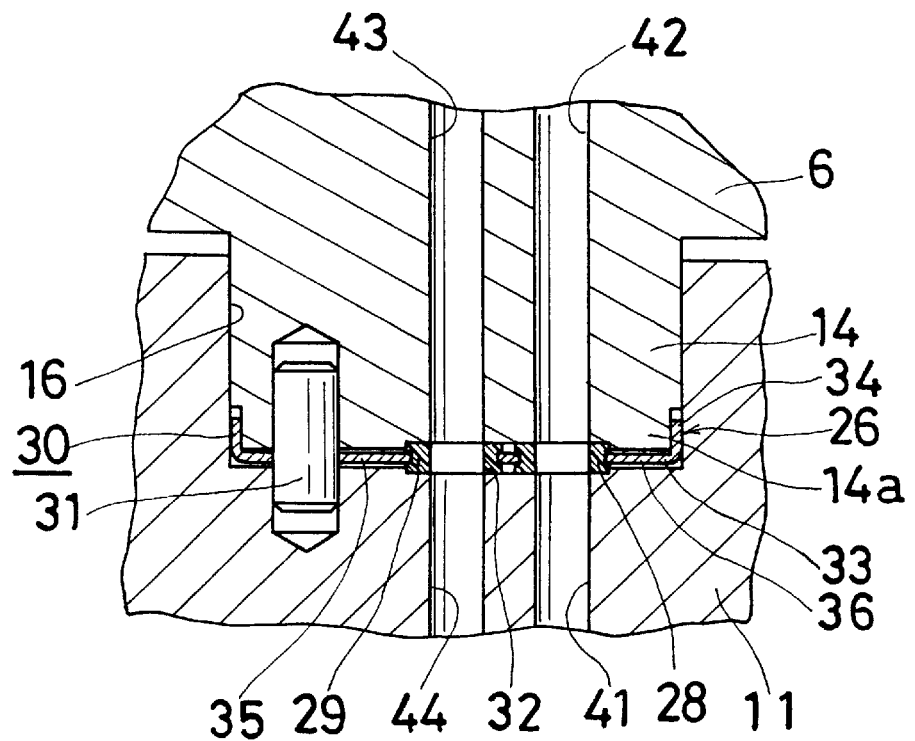
FIG. 2 is an enlarged view in vertical section of a seal.

With reference to FIG. 2, the seal 26 comprises a first annular gasket 28 provided between an edge portion of the valve main body 6 defining the downwardly open end of the inlet channel 42 thereof and an edge portion of the connector 11 defining the upwardly open end of the inlet channel 41 thereof and opposed to the edge portion, a second annular gasket 29 provided between an edge portion of the valve main body 6 defining the downwardly open end of the outlet channel 43 thereof and an edge portion of the connector 11 defining the upwardly open end of the outlet channel 44 thereof and opposed to the last-mentioned edge portion, a retainer 30 holding the two gaskets 28, 29 and attached to the valve main body 6, and a spring pin 31 for positioning the retainer 30 in place. The opposed edge portions defining the open ends of the inlet channels 41, 42 and outlet channels 43, 44 are smooth-surfaced by spot facing as indicated at 32 for contact with the gasket 28 or 29 and for positioning the gasket with good stability. The spot facing 32 can be dispensed with by polishing the faces to be brought into contact with the gaskets 28, 29.

Figure 3:
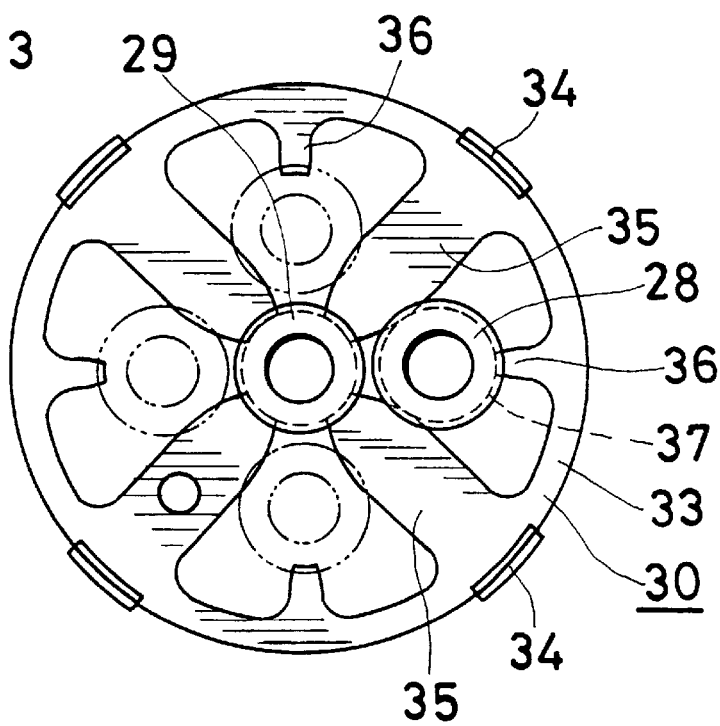
FIG. 3 is an enlarged plan view of a retainer and gaskets.
Figure 4:
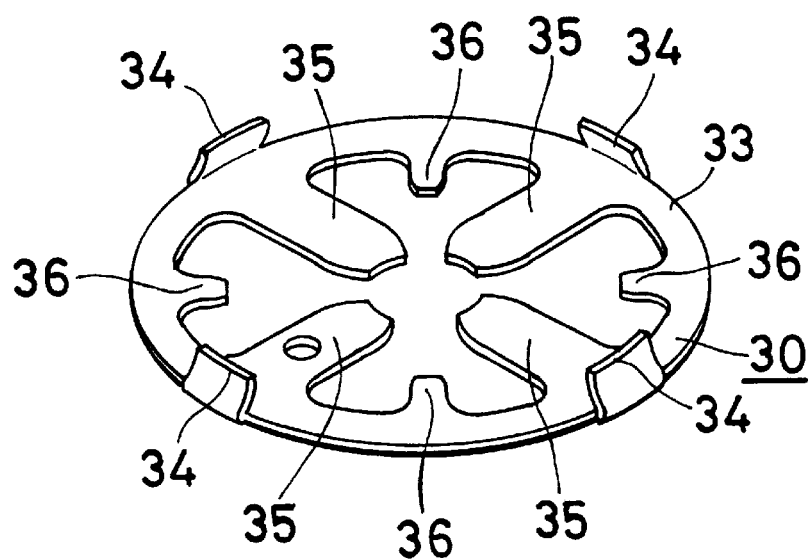
FIG. 4 is an enlarged perspective view of the retainer.

The retainer 30 is in the form of an integral piece prepared from a stainless steel plate. As shown in greater detail in FIGS. 3 and 4, the retainer 30 comprises a ring portion 33, a plurality of body holding lugs 34 extending upward from the ring portion 33 for attaching the retainer 30 to the valve main body 6, and gasket holding claws 35, 36 extending radially inward from the ring portion 33 for holding the gaskets. The body holding lugs 34 are four in number, equidistantly spaced apart and bent slightly inward to hold with their resilience a small-diameter portion 14a formed at the lower end of cylindrical portion 14 of the valve main body 6. There are two kinds of gasket holding claws 35, 36, i.e., four large claws 35 equidistantly spaced apart and extending nearly to the center of the ring portion 33, and four small claws 36 positioned between the large claws 35. The claws are slightly resilient. The second gasket 29 is held by the inner ends of the four large claws 35. The first gasket 28 is held by the opposed side edges of adjacent two large claws 35 and the inner end of the small claw 36 between these large claws 35. According to the present embodiment, the first and second gaskets 28, 29 are provided for the two kinds of channels, respectively, i.e., for the inlet channels 41, 42 and for the outlet channels 43, 44, whereas four gaskets as arranged around the second gasket 29 can be held by the retainer 30, each by the opposed side edges of adjacent two large claws 35 and the inner end of the smaller claw 36 therebetween. Thus, the retainer 30 is usable for pairs of opposed inlet or outlet channels. The gasket holding claws 35 or 36 of the retainer 30 are not limited to four in number; the number of claws may be altered with the number of gaskets 28 or 29 to be held.

Figure 5:
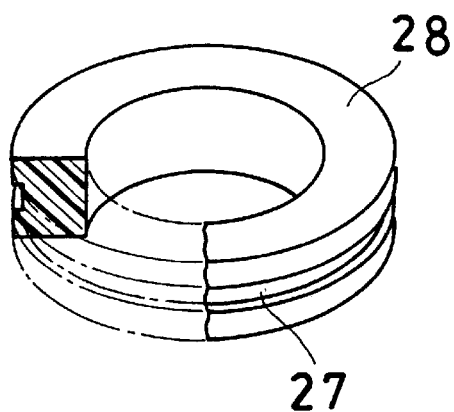
FIG. 5 is an enlarged perspective view partly broken away and showing the gasket.

As shown in FIG. 5, an annular groove 37 for fitting the gasket holding claws 35, 36 of the retainer 30 in is formed in the outer periphery of each of the first gasket 28 and the second gasket 29, whereby the the gaskets 28, 29 are reliably held and accurately positioned by the retainer 30. Accordingly, even if the valve main body 6 is repeatedly installed and removed, the gaskets 28, 29 are unlikely to shift relative to the main body 6 and the connector 11, assuring the opposed portions of the main body 6 and the connector 11 of seal properties.

Like seal 26 is provided also between the cylindrical portion 18 of valve main body 8 of the second on-off valve 4 and the upward recessed portion 20 of connector 18 of the valve 4.

Although FIG. 1 shows only the fluid inlet-side portion of the fluid control apparatus, the downstream side of the apparatus can be provided with a suitable arrangement of valves similar to the on-off valves 2, 4 and other fluid controllers such as a mass flow controller for controlling the flow rate of fluid, pressure regulator for controlling the pressure of fluid and a valve for changing the direction of flow. With each of these fluid controllers, a conroller main body is attached to a connector disposed beneath the main body with screws driven in from above, and the adjacent connectors are connected to each other with a screw driven in sideways. If the operating portion of one of these controllers malfunctions, the operating portion can then be removed from the connector along with the controller main body.

What is claimed is:

1. A fluid controller comprising:

a controller main body formed with a controller main body inlet channel and a controller main body outlet channel, wherein said controller main body outlet channel and said controller main body inlet channel each have a downwardly open end;

an operating portion integral with said controller main body for any one of opening and closing said controller main body inlet and outlet channels, changing a direction of flow, and regulating a rate of flow;

a connector formed with a connector inlet channel and a connector outlet channel, wherein said connector inlet channel and said connector outlet channel each have a first end which is upwardly open and a second end which is laterally open and each communicate with said controller main body inlet channel and said controller main body outlet channel of said controller main body, respectively said connector being removably attached to said controller main body;

a seal provided between said controller main body and said connector, wherein said seal comprises a first gasket provided between a first edge portion of said controller main body defining said downwardly open end of said controller main body inlet channel and a first edge portion of said connector defining said upwardly open end of said connector inlet channel and said first edge portion of said connector being opposed to said first edge portion of said connector main body, a second gasket provided between a second edge portion of said controller main body defining said downwardly open end of said controller main body outlet channel and a second edge portion of said connector defining said upwardly open end of said connector outlet channel and said second edge of said connector being opposed to said second edge of said controller main body: and a retainer holding said first and second gaskets thereto, wherein said retainer is attached to any one of said controller main body and said connector.

2. The fluid controller as in claim 1, further comprising a spring pin for positioning said retainer in place.

3. The fluid controller as in claim 1, wherein said retainer includes a ring portion.

4. The fluid controller as in claim 3, wherein said retainer includes a plurality of body holding lugs extending upwardly from said ring portion for attaching said retainer to said controller main body.

5. The fluid controller as in claim 4, wherein said retainer includes a plurality of gasket holding claws which extend radially inwardly from said ring portion for holding said first and second gaskets.

6. The fluid controller as in claim 5, wherein said retainer is an integral piece made from stainless steel.

7. The fluid controller as in claim 4, wherein said plurality of body holding lugs includes four body holding lugs which are equidistantly spaced apart from each other and bent slightly inwardly to hold, by means of resilience, a small diameter portion of a cylindrical portion of said controller main body at a lower end of said cylindrical portion.

8. The fluid controller as in claim 5, wherein said plurality of gasket holding claws include a plurality of large-type gasket holding claws and a plurality of small-type gasket holding claws.

9. The fluid controller as in claim 8, wherein said plurality of large-type gasket holding claws include four claws equidistantly spaced apart and extending nearly to a center of said ring portion of said retainer.

10. The fluid controller as in claim 9, wherein said plurality of small-type gasket holding claws include four claws equidistantly spaced apart and positioned between said four large-type claws.

11. The fluid controller as in claim 10, wherein said plurality of small-type claws and large-type claws are all slightly resilient.

12. The fluid controller as in claim 11, wherein said second gasket is held by inner ends of said four large-type claws.

13. The fluid controller as in claim 12, wherein said first gasket is held by opposed side edges of two adjacent large-type claws and an inner end of one small-type claw located between said two adjacent large-type claws.

14. The fluid controller as in claim 5, wherein said first gasket and said second gasket each have an annular groove in an outer periphery thereof for fitting said gasket holding claws of said retainer.

* * * * *